(12) United States Patent
Choi (10) Patent No.: US 9,857,908 B2
(45) Date of Patent: Jan. 2, 2018

(54) DISPLAY DEVICE HAVING A TOUCH UNIT (71) Applicant: SAMSUNG DISPLAY CO., LTD., Yongin, Gyeonggi-Do (KR)

(72) Inventor: Sun Hyung Choi, Cheonan-si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 115 days.

(21) Appl. No.: 14/684,489

(22) Filed: Apr. 13, 2015

(65) Prior Publication Data

US 2016/0092001 A1 Mar. 31, 2016

(30) Foreign Application Priority Data

Sep. 25, 2014 (KR) .................... 10-2014-0128261

(51) Int. Cl.
*G06F 3/044* (2006.01)
*G06F 3/041* (2006.01)
*G06F 1/16* (2006.01)

(52) U.S. Cl.
CPC .......... *G06F 3/0416* (2013.01); *G06F 1/1643* (2013.01)

(58) Field of Classification Search
CPC ................. G06F 3/0416; G06F 1/1643
USPC .................................. 345/156–184
See application file for complete search history.

(56) References Cited

U.S. PATENT DOCUMENTS

| 2010/0090981 A1* | 4/2010 | Park ........................ G06F 3/041 345/174 |
| 2011/0193478 A1 | 8/2011 | Kim |
| 2011/0193817 A1* | 8/2011 | Byun .................... G06F 3/0418 345/174 |
| 2012/0162938 A1 | 6/2012 | Kim et al. |
| 2013/0127770 A1* | 5/2013 | Trend ..................... G06F 3/044 345/174 |

FOREIGN PATENT DOCUMENTS

| KR | 1020060078866 | 7/2006 |
| KR | 10-1033155 | 5/2011 |
| KR | 101033155 B1 * | 5/2011 |
| KR | 1020110092063 | 8/2011 |
| KR | 1020120075165 | 7/2012 |

* cited by examiner

*Primary Examiner* — Carolyn R Edwards
(74) *Attorney, Agent, or Firm* — F. Chau & Associates, LLC (57) ABSTRACT

A display device includes a first substrate and a second substrate disposed above the first substrate. A touch unit is disposed on the second substrate. A window is disposed on the touch unit. The window covers the first and second substrates. A touch printed circuit board is disposed on the second substrate. The touch printed circuit board is coupled to the touch unit. An adhesive layer is disposed between the first substrate and the window. A plurality of spacers are disposed between the touch printed circuit board and the window. Each of the plurality of spacers is spaced apart from each other.

16 Claims, 7 Drawing Sheets

FIG. 7

DISPLAY DEVICE HAVING A TOUCH UNIT

CROSS-REFERENCE TO RELATED APPLICATION

This application claims priority under 35 U.S.C. §119 to Korean Patent Application No. 10-2014-0128261, filed on Sep. 25, 2014 in the Korean Intellectual Property Office, the disclosure of which is incorporated by reference herein in its entirety.

TECHNICAL FIELD

Exemplary embodiments of the present invention relate to a display device, and more particularly to a display device having a touch unit.

DISCUSSION OF RELATED ART

In general, flat panel displays, such as liquid crystal displays and organic light emitting diode displays, may include two electric field generating electrodes and an electro-optical active layer disposed between the electric field generating electrodes. In the liquid crystal display, a liquid crystal layer may be included as the electro-optical active layer. In the organic light emitting diode display, an organic light emitting layer may be included as the electro-optical active layer.

One of the electric field generating electrodes may be coupled to a switching element so as to receive an electric signal. The electro-optical active layer may convert the electric signal into an optical signal so that an image is displayed.

Such flat panel displays may have a structure in which a protective window is disposed on a display panel on which the image is displayed. The display panel and the window may be bonded to each other by an adhesive layer. Light may be transmitted from above the window or from sides of the window toward the display panel so as to cure the adhesive layer so that the display panel and the window are firmly joined to each other.

SUMMARY

Exemplary embodiments of the present invention include a display device that may prevent or reduce a lifting phenomenon of an adhesive layer and a bonding defect between a window and a display panel by allowing light to be transmitted to an entire region of the adhesive layer bonding the window to the display panel.

According to an exemplary embodiment of the present invention, a display device includes a first substrate and a second substrate disposed above the first substrate. A touch unit is disposed on the second substrate. A window is disposed on the touch unit. The window covers the first and second substrates. A touch printed circuit board is disposed on the second substrate. The touch printed circuit board is coupled to the touch unit. An adhesive layer is disposed between the first substrate and the window. A plurality of spacers is disposed between the first substrate and the window. Each of the plurality of spacers is spaced apart from each other.

The touch unit may include a touch panel, a touch pad part, and a touch driver, and the touch printed circuit board may be connected to the touch pad part.

The touch printed circuit board may be a flexible printed circuit board.

Each of the plurality of spacers may be aligned with each other on the touch printed circuit board.

The display device may include a driver disposed on the first substrate. A driver printed circuit board may be disposed on the first substrate and may be coupled to the driver.

The driver printed circuit board may be a flexible printed circuit board.

The display device may include a polarizer disposed between the touch unit and the window.

According to an exemplary embodiment of the present invention, a display device includes a first substrate and a second substrate disposed above the first substrate. A touch unit is disposed on the second substrate. A window is disposed on the touch unit. The window covers the first and second substrates. A touch printed circuit board is disposed on the second substrate. The touch printed circuit board is coupled to the touch unit. An adhesive layer is disposed between the first substrate and the window. A spacer is disposed between the touch printed circuit board and the window. The spacer has a protruding pattern.

The touch unit may include a touch panel, a touch pad part, and a touch driver, and the touch printed circuit board may be connected to the touch pad part.

The touch printed circuit board may be a flexible printed circuit board.

The spacer may be disposed on the touch printed circuit board. The protruding pattern may have a polygon shape.

The display device may include a driver disposed on the first substrate. A driver printed circuit board may be disposed on the first substrate and may be coupled to the driver.

The driver printed circuit board may be a flexible printed circuit board.

The display device may include a polarizer disposed between the touch unit and the window.

According to exemplary embodiments of the present invention, the display device may allow externally radiated light to be transmitted to substantially an entire region of an adhesive layer. The adhesive layer may bond a window to a display panel, and, thus, may reduce or eliminate lifting of the adhesive layer. A bonding defect between the window and the display panel may be reduced or eliminated.

BRIEF DESCRIPTION OF THE DRAWINGS

A more complete appreciation of the present invention will become more apparent by describing in detail exemplary embodiments thereof with reference to the accompanying drawings, wherein.

DETAILED DESCRIPTION

Exemplary embodiments of the present invention will be described below in more detail with reference to the accompanying drawings. The present invention may, however, be embodied in many different forms and should not be construed as being limited to the exemplary embodiments set forth herein. Like reference numerals may refer to like elements throughout the specification and drawings.

The spatially relative terms, such as "below", "beneath", "lower", "above", "upper", and the like, may be used herein to describe the relationship between one element or component and another element or component as illustrated in the drawings. It will be understood that the spatially relative terms may encompass different orientations of the device in use or operation, in addition to the orientation depicted in the drawings.

The terminology used herein is for the purpose of describing exemplary embodiments of the present invention and is not to be construed as limiting the invention.

Figure 1:
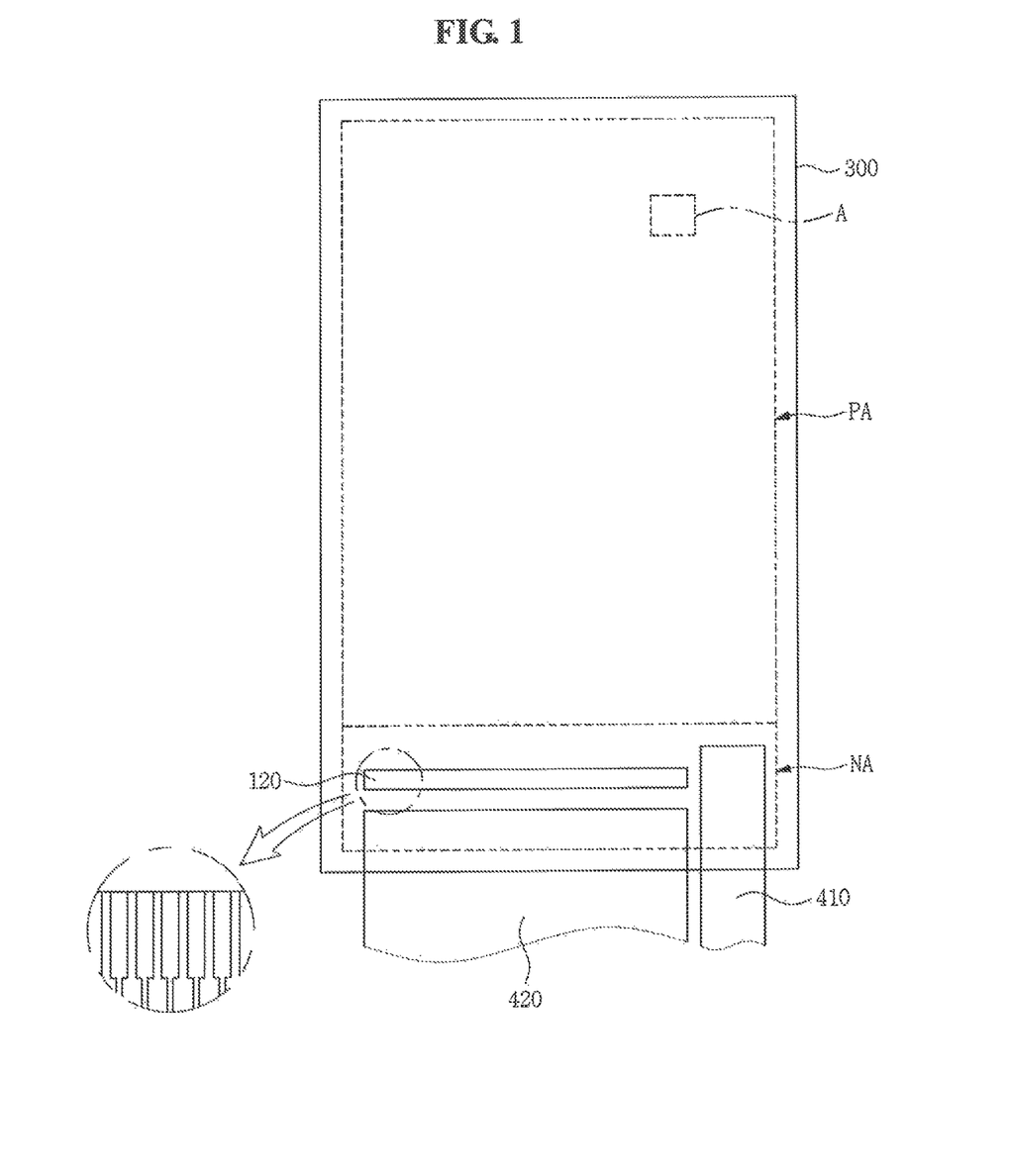
FIG. 1 is a schematic plan view illustrating a configuration of a display device according to an exemplary embodiment of the present invention.
Figure 2:
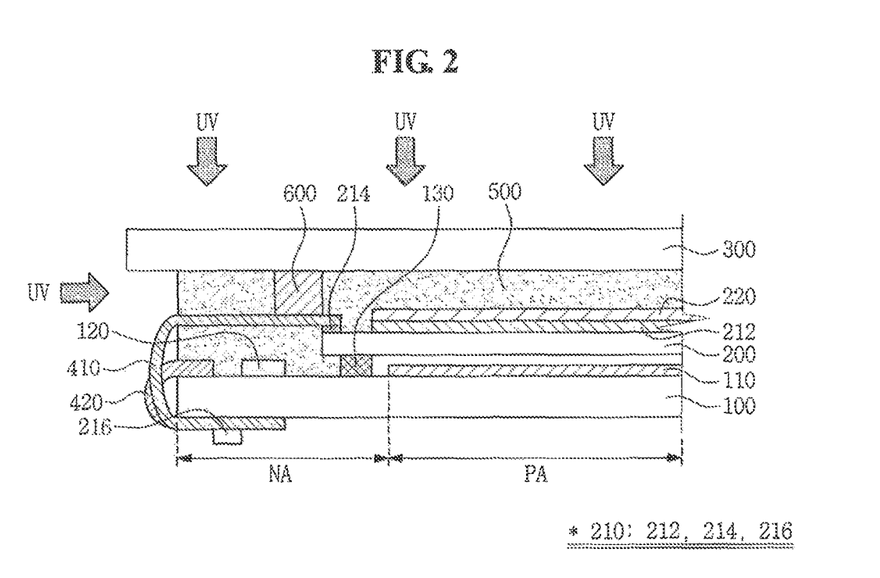
FIG. 2 is a cross-sectional view of the display device illustrated in FIG. 1.

FIG. 1 is a schematic plan view illustrating a configuration of a display device according to an exemplary embodiment of the present invention. FIG. 2 is a cross-sectional view of the display device illustrated in FIG. 1.

Referring to FIGS. 1 and 2, the display device according to an exemplary embodiment of the present invention may include a first substrate 100, a second substrate 200 facing the first substrate 100, a touch unit 210 disposed on the second substrate 200, a window 300 disposed on the touch unit 210 and covering the first and second substrates 100 and 200, a touch printed circuit board (PCB) 410 disposed on the second substrate 200, an adhesive layer 500 disposed between the first substrate 100 and the window 300, and a spacer 600 disposed between the touch PCB 410 and the window 300.

According to an exemplary embodiment of the present invention, the display device may be an organic light emitting diode (OLED) display or a liquid crystal display (LCD). Hereinafter, the display device will be described as the ° LED display. However, exemplary embodiments of the present invention are not limited thereto. The first substrate 100, a display unit 110, the second substrate 200, and the touch unit 210 may be collectively referred to as a display panel.

The first substrate 100 may include a transparent material (e.g., a $SiO_2$-based glass material), but exemplary embodiments of the present invention are not limited thereto. The first substrate 100 may include a transparent plastic material. The first substrate 100 may be divided into a display area PA and a pad area NA. A plurality of pixels may be disposed in the display area PA of the first substrate 100. The plurality of pixels may display images. One or more panel drivers 120 may be disposed in the pad area NA.

The first substrate 100 may include a scan driver (not shown) and a data driver (not shown) that are configured to drive the plurality of pixels. The first substrate 100 may include a pad electrode (not shown) in the pad area NA. The panel driver 120 may be a driver integrated circuit (IC). The driver IC may be disposed in the pad area NA of the first substrate 100 by a chip-on-glass (COG) method. The driver IC may be coupled to (e.g., electrically connected to) the pad electrode. However, the panel driver 120 need not be disposed in the pad area NA or the panel driver 120 may be omitted from the display panel. The first substrate 100 may include wires (e.g., conductive lines) connecting the panel driver 120, the scan driver, and the data driver to each other. A cushion member (not shown) may protect the panel driver 120 from an external impact. The cushion member may be disposed in the pad area NA.

The display unit 110 may be disposed on the first substrate 100 and may be connected to the panel driver 120. The display unit 110 will be described below in more detail with reference to FIG. 7.

The second substrate 200 may be coupled to the first substrate 100 by a sealant 130 (e.g. a sealing glass frit). The second substrate 200 may cover the display unit 110 and may protect the display unit 110 from damage. The second substrate 200 may include a same material as the first substrate 100, but exemplary embodiments of the present invention are not limited thereto. The second substrate 200 may include a transparent, synthetic resin film (e.g., an acryl film). The second substrate 200 may additionally include one or more metals. In an exemplary embodiment of the present invention the second substrate 200 may include polyethylene (PET) film, polypropylene (PP) film, a polyamide (PA) film, polyacetal (POM or polyoxymethylene) film, poly(methyl methacrylate) (PMMA) film, polybutylene terephthalate (PBT) film, a polycarbonate (PC) film, a cellulose film, and/or a moisture-proof cellophane.

The second substrate 200 may have a smaller area than the first substrate 100. Therefore, the pad area NA of the first substrate 100 need not be covered by the second substrate 200.

The touch unit 210 may include a touch panel 212, a touch pad part 214, and a touch driver 216. The touch unit 210 may be used as an input to the display device. The touch unit 210 may be resistive or capacitive. The touch panel 212 may be disposed on the second substrate 200. The touch panel 212 may be disposed in the display area PA of the first substrate 100. The touch pad part 214 may be disposed on the second substrate 200. The touch pad part 214 may be disposed in the pad area NA of the first substrate 100. The touch driver 216 may be disposed on the touch PCB 410.

The touch panel 212 may be disposed on the second substrate 200. The touch panel 212 may include electrodes corresponding to a touch sensor pattern. The electrodes may cross (e.g., intersect) each other, but exemplary embodiments of the present invention are not limited thereto. The touch panel 212 may have an on-cell structure in which the electrodes corresponding to a touch sensor pattern are patterned directly on a pixel of the second substrate 200. The touch panel 212 may detect a touch or contact from, for example, a pen and/or a user's finger and may transmit a signal corresponding to a position where the touch or contact occurred to the touch driver 216.

The window 300 may include a transparent material e.g., glass or resin). The window 300 may protect the display panel from being broken or damaged by an external impact. The window 300 may be disposed on the touch unit 210 or may be disposed on a polarizer 220. The window 300 may cover the display area PA and the pad area NA of the first substrate 100. The window 300 may cover the second substrate 200. The window 300 may be coupled to the first substrate 100 and the second substrate 200 by the adhesive layer 500. The adhesive layer 500 may be disposed between the first substrate 100 and the window 300. The window 300 may be larger in size than the display panel, but exemplary embodiments of the present invention are not limited thereto. The window 300 may be substantially the same size as the display panel.

The touch PCB 410 may be disposed on the second substrate 200. The touch PCB 410 may be connected to the touch pad part 214 so as to be electrically connected to the touch panel 212.

The touch PCB 410 may be a flexible PCB. The touch PCB 410 may be disposed on the touch pad part 214 of the second substrate 200 by a chip-on-film (COF) method.

Figure 3:
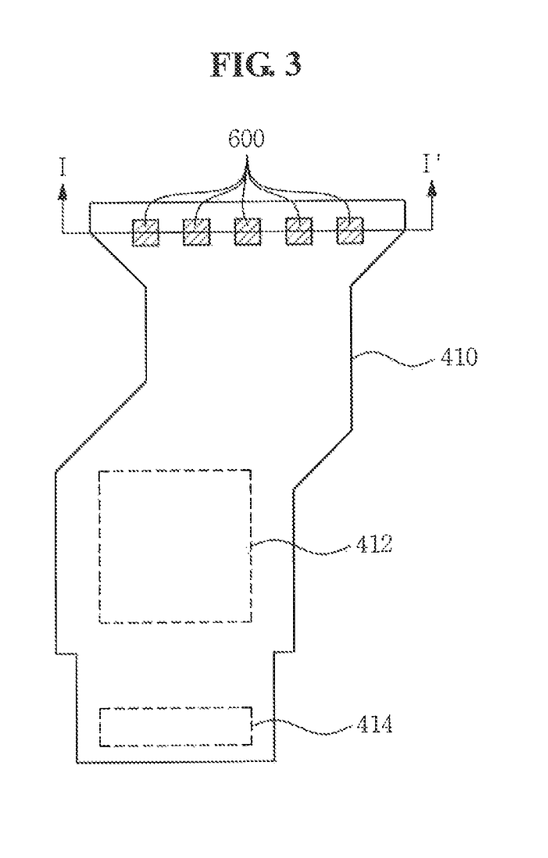
FIG. 3 is a plan view illustrating a touch printed circuit board of a display device according to an exemplary embodiment of the present invention.

The touch PCB 410 may include an electronic device (e.g., electronic device 412 illustrated in FIG. 3). The electronic device may be configured to process driving signals. The electronic device may include a connector (e.g., connector 414 illustrated in FIG. 3) configured to transmit external signals to the touch driver 216. Therefore, the touch PCB 410 may electrically connect the touch sensor pattern of the touch panel 212 to the touch driver 216.

The touch PCB 410 may be bent so as to cover one side (e.g., one edge) of the first substrate 100. The touch PCB 410 may be coupled to a surface of the first substrate 100 by double-sided tape that may be disposed between the PCB 410 and the surface of the first substrate 100.

A driver PCB 420 may be disposed on the first substrate 100. The driver PCB 420 may be electrically connected to the panel driver 120 to connect the PCB 420 to a pad electrode (not shown) disposed on the first substrate 100.

The driver PCB 420 may be a flexible PCB. The driver PCB 420 may be disposed in the pad area NA of the first substrate 100 in a chip-on-film (COF) configuration.

The driver PCB 420 may include an electronic device e.g., the electronic device 412 illustrated in FIG. 3) configured to process driving signals. The driver PCB 420 may include a connector (e.g., the connector 414 illustrated in FIG. 3) configured to transmit external signals to the panel driver 120. The electronic device may include a plurality of components configured to drive the display device. The plurality of components may include, for example, one or more DC-DC converters.

The driver PCB 420 may be bent. The driver PCB 420 may cover one side (e.g., one edge) of the first substrate 100. The driver PCB 420 may be coupled to a surface of the first substrate 100 by double-sided tape that that may be disposed between the driver PCB 420 and the surface of the first substrate 100.

The adhesive layer 500 may be disposed between the first substrate 100 and the window 300. The adhesive layer 500 may be configured to increase luminance, transmittance, reflectance, and visibility of the display device. The adhesive layer 500 may prevent an air gap from being formed between the first substrate 100 and the window 300 and between the second substrate 200 and the window 300 and may also prevent foreign matter such as dust from penetrating into the display device.

The adhesive layer 500 may include a resin. The resin may be a photo-curable resin. An amount (e.g., a relatively small amount) of a photoinitiator may be included in the resin. The photoinitiator may be exposed to, for example, ultraviolet (UV) light so as to initiate a photo-polymerization reaction. Then a monomer, which is a primary element of a resin-forming composition, and an oligomer may be polymerized (e.g., instantaneously polymerized) to be cured.

The spacer 600 may be disposed between the touch PCB 410 and the window 300. The spacer 600 may support the touch PCB 410 and the window 300. When an external force is exerted on the window 300, the spacer 600 may act as a reinforcement that is resistant to the external force because the spacer 600 may occupy a space between the touch PCB 410 and the window 300.

The spacer 600 will be described in more detail below with reference to FIGS. 3 to 6. An arrangement and a shape of the spacer 600 will be described in more detail below with reference to FIGS. 3 to 6.

Figure 4:
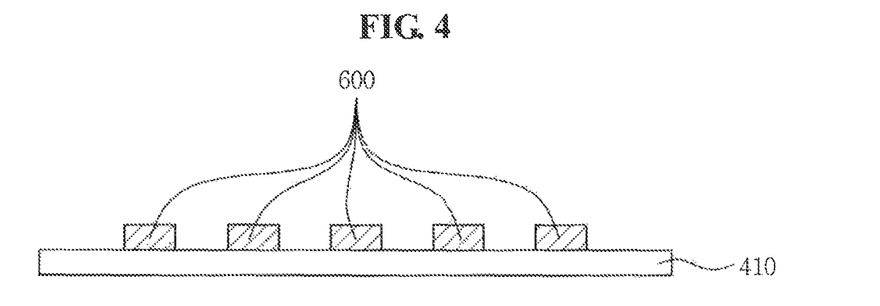
FIG. 4 is a cross-sectional view taken along line of FIG. 3.

FIG. 3 is a plan view illustrating a touch printed circuit board of a display device according to an exemplary embodiment of the present invention. FIG. 4 is a cross-sectional view taken along line of FIG. 3.

Referring to FIGS. 3 and 4, a plurality of spacers 600 may be disposed on the touch PCB 410. The plurality of spacers 600 may be spaced apart from each other and may be aligned with each other along a side (e.g., an edge) of the touch PCB 410.

Where the touch PCB 410 is bent so as to cover one side (e.g., one edge) of the first substrate 100, the plurality of spacers 600 may be disposed in a region where the touch PCB 410 is not bent so as to occupy the space between the touch PCB 410 and the window 300. The plurality of spacers 600 may be disposed adjacent to a region where the touch PCB 410 is coupled to the touch pad part 214 (see, e.g., FIG. 2).

The spacer 600 may have a thickness that is equal to or substantially the same as a distance between the touch PCB 410 and the window 300. A width of the spacer 600 may be equal to a distance between the spacers 600, but exemplary embodiments of the present invention are not limited thereto. The thickness and width of the spacer 600 and the distance between the plurality of spacers 600 may be changed as desired.

The adhesive layer 500 may be cured by light radiated from an outside of the window 300 toward the display panel. The light curing the adhesive layer 500 may pass through one or more spaces between the spacers 600. The light radiated from an outside of the window 300 toward the display panel may be evenly radiated onto the adhesive layer 500 disposed between the spacers 600 as well as the adhesive layer 500 disposed outside the plurality of spacers 600. Therefore, the display device according to an exemplary embodiment of the present invention may reduce or prevent discoloration and separation of the window 300 that may occur due to non-curing of the adhesive layer 500. The display device according to an exemplary embodiment of the present invention may also reduce or prevent lifting of the adhesive layer 500.

Figure 5:
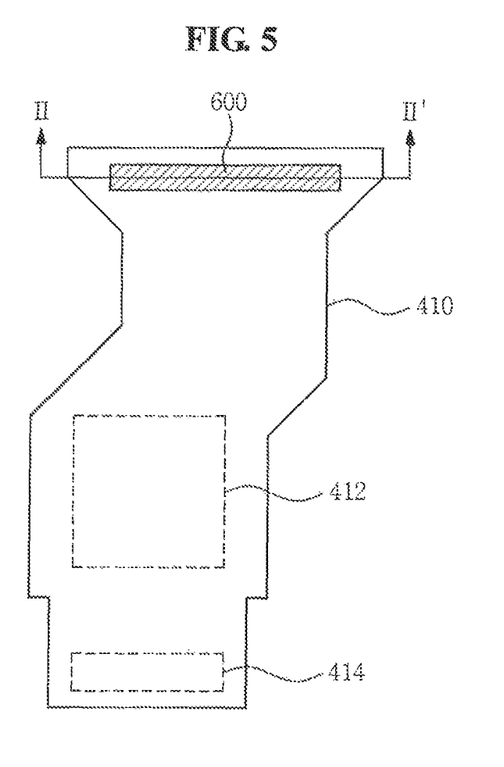
FIG. 5 is a plan view illustrating a touch printed circuit board of a display device according to an exemplary embodiment of the present invention.
Figure 6:
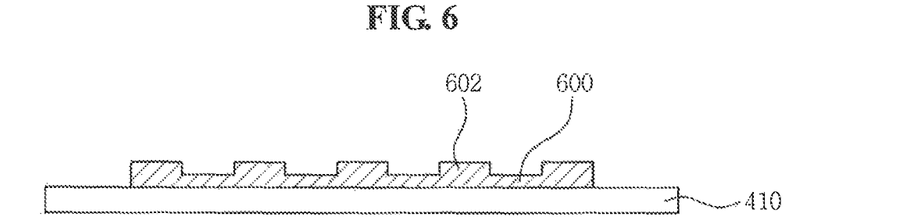
FIG. 6 is a cross-sectional view taken along line II-II' of FIG. 5.

FIG. 5 is a plan view illustrating a touch printed circuit board of a display device according to an exemplary embodiment of the present invention. FIG. 6 is a cross-sectional view taken along line II-II' of FIG. 5.

Referring to FIGS. 5 and 6, the spacer 600 may include one spacer. The spacer 600 may include a protruding pattern, and apart from that, the spacer 600 illustrated in FIGS. 5 and 6 may be consistent with the spacer 600 illustrated in FIGS. 3 and 4. Thus, descriptions of the same elements of the spacer 600 may be omitted.

The spacer 600 may be disposed on a side (e.g., an edge) of the touch PCB 410. The spacer 600 may be quadrangular in shape, and may include at least one protruding pattern 602, but the spacer 600 is not limited thereto. The spacer 600 may have various shapes. The protruding pattern 602 may also have various shapes. The protruding pattern 602 may have a polygon shape, such as, a quadrilateral, a triangle, a circle or a semicircle.

A thickness of the protruding pattern 602 may be more than half of a distance between the touch PCB 410 and the window 300 in view of light radiation for curing the adhesive layer 500, but the thickness of the protruding pattern 602 is not limited thereto. The thickness of the protruding pattern 602 may be adjusted, as desired. A width of the protruding pattern 602 may be equal to a distance between the protruding patterns 602, but exemplary embodiments of the present invention are not limited thereto. The width of the protruding pattern 602 and the distance between the protruding patterns 602 may also be adjusted, as desired.

The spacer 600 on which a plurality of protruding patterns 602 are disposed may have a greater hardness compared to a hardness of the plurality of spacers 600 not including the plurality of protruding patterns 602.

Figure 7:
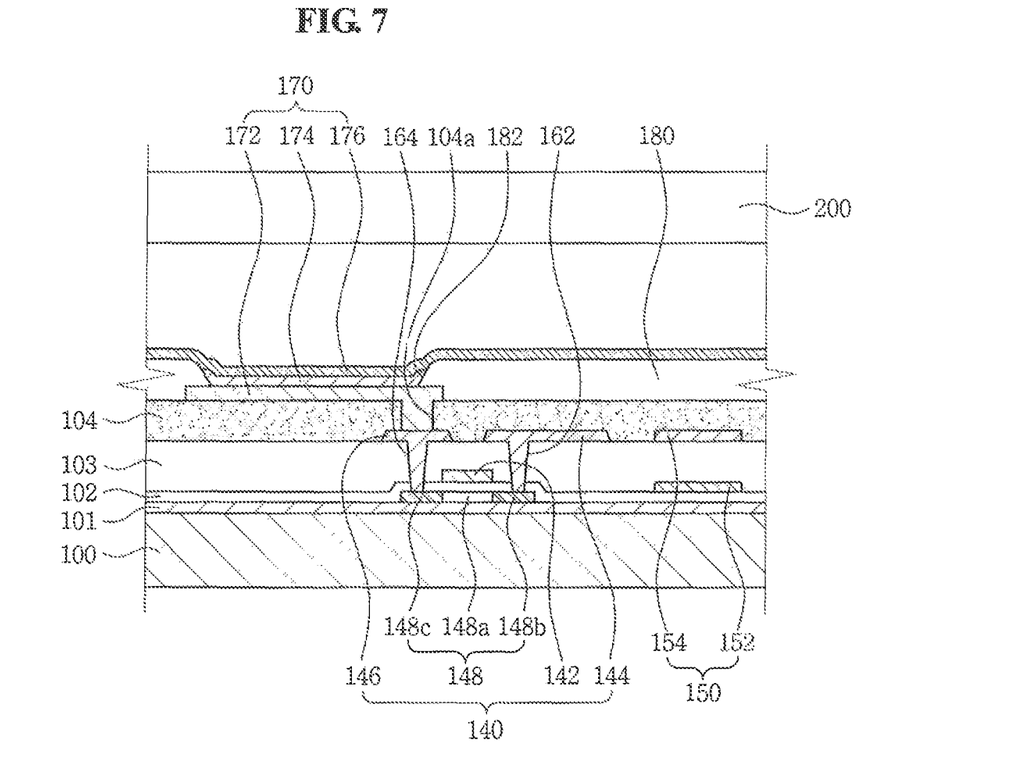
FIG. 7 is a cross-sectional view of a configuration of a pixel disposed in area A of FIG. 1.

FIG. 7 is a cross-sectional view of a configuration of a pixel disposed in area A of FIG. 1.

Referring to FIG. 7, the display device according to an exemplary embodiment of the present invention may be an OLED display, but exemplary embodiments of the present invention are not limited thereto. The display device may be an LCD.

The first substrate 100 may be an insulating substrate including glass, quartz, ceramic, or plastic, but exemplary embodiments of the present invention are not limited thereto. The first substrate 100 may be a conductive metal substrate including, for example, stainless steel.

A buffer layer 101 may be disposed on the first substrate 100. The buffer layer 101 may reduce or prevent infiltration of undesirable elements, such as impurities, to the display device. The buffer layer 101 may planarize a surface of the display device (e.g., a surface of the first substrate 100). The buffer layer 101 may include various different materials suitable for performing such functions. For example, the buffer layer 101 may include silicon nitride ($SiN_x$), silicon dioxide ($SiO_2$), and/or a silicon oxynitride ($SiO_xN_y$). However, the buffer layer 101 need not always be disposed on the first substrate 100, and need not be provided according to the types and/or process conditions of the first substrate 100.

A semiconductive layer 148 may be disposed on the buffer layer 101. The semiconductive layer 148 may include a semiconductive material. The semiconductive material may include a polycrystalline silicon layer, an amorphous silicon layer, and an oxide semiconductor, such as indium gallium zinc oxide (IGZO) and/or indium zinc tin oxide (IZTO). For example, when the semiconductive layer 148 includes the polycrystalline silicon layer, the semiconductive layer 148 may include a channel area 148a that is not doped with impurities and p+ doped source and drain areas 148b and 148c disposed on sides of the channel area 148a. In an exemplary embodiment of the present invention, p-type impurities, such as boron (B), may be used as dopant ions. For example, $B_2H_6$ may be generally used. Herein, such impurities may vary depending, for example, on the kinds of thin film transistors (TFTs).

A gate insulating layer 102 including silicon nitride ($SiN_x$) or silicon dioxide ($SiO_2$) may be disposed on the semiconductive layer 148. The gate insulating layer 102 may include tetraethyl orthosilicate (TEOS), silicon nitride ($SiN_x$), and/or silicon dioxide ($SiO_2$). In an exemplary embodiment of the present invention the gate insulating layer 102 may have a double layer structure in which a silicon nitride layer having a thickness of about 40 nm and a TEOS layer having a thickness of about 80 nm are sequentially disposed, but the structure of the gate insulating layer 102 is not limited thereto. The gate insulating layer 102 may have various structures.

A gate wire including a gate electrode 142 may be disposed on the gate insulating layer 102. The gate wire may include a gate line, a first storage electrode 152, and other wires. The gate electrode 142 may overlap at least a part of the semiconductive layer 148 and may overlap the channel area 148a. The gate electrode 142 may prevent the channel area 148a from being doped with impurities when the source and drain areas 148b and 148c of the semiconductive layer 148 are doped with the impurities in a process of forming the semiconductive layer 148.

The gate electrode 142 and the first storage electrode 152 may be disposed on the same layer and may include the same metal material. The metal material may include molybdenum (Mo), chromium (Cr), and/or tungsten (W). For example, the gate electrode 142 and the first storage electrode 152 may include molybdenum (Mo) or a molybdenum alloy.

An interlayer insulating layer 103 covering the gate electrode 142 may be disposed on the gate insulating layer 102. The gate insulating layer 102 and the interlayer insulating layer 103 may have a source contact opening 162 (e.g., a source contact hole), which may expose the source area 148b of the semiconductive layer 148, and a drain contact opening 164 (e.g., a drain contact hole), which may expose the drain area 148c of the semiconductive layer 148. The interlayer insulating layer 103 may include tetraethyl orthosilicate (TEOS), silicon nitride ($SiN_x$), or silicon oxide ($SiO_x$), but exemplary embodiments of the present invention are not limited thereto.

A data wire including a source electrode 144 and a drain electrode 146 may be disposed on the interlayer insulating layer 103. The data wire may include a data line, a common power line, a second storage electrode 154, and other wires. The source electrode 144 and the drain electrode 146 may be respectively coupled to the source area 148b and the drain area 148c of the semiconductive layer 148 through the source contact openings 162 and the drain contact opening 164.

A thin film transistor (TFT) 140 including the gate electrode 142, the source electrode 144, the drain electrode 146, and the semiconductive layer 148 may be formed as described above. The TFT 140 may be a PMOS-structured TFT including the p-type impurities, but exemplary embodiments of the present invention are not limited thereto. An NMOS-structured or CMOS-structured TFT may also be used as the TFT 140. The TFT 140 may be a polycrystalline TFT, an amorphous TFT including an amorphous silicon layer, or an oxide semiconductor TFT.

A capacitor 150 including the first storage electrode 152 and the second storage electrode 154 may be disposed on the interlayer insulating layer 103. In an exemplary embodiment of the present invention, the interlayer insulating layer 103 may include a dielectric material of the capacitor 150.

A planarization layer 104 covering the data wire may be disposed on the interlayer insulating layer 103. The planarization layer 104 may reduce or eliminate steps and may provide a planarized surface for an organic light emitting diode (OLED) 170, which may increase luminosity of the OLED 170 that is disposed on the planarization layer 104. The planarization layer 104 may include a pixel electrode contact opening 104a (e.g., a pixel electrode contact hole), which may expose a part of the drain electrode 146.

The planarization layer 104 may include a polyacrylate resin, an epoxy resin, a phenolic resin, a polyamide resin, a polyimide resin, an unsaturated polyester resin, a polyphenylenether resin, a polyphenylene sulfide resin, and/or benzocyclobutene (BCB).

A pixel electrode 172 of the OLED 170 may be disposed on the planarization layer 104. The pixel electrode 172 may serve as an anode. The pixel electrode 172 may be coupled to the drain electrode 146 through the contact opening 104a of the planarization layer 104.

A pixel defining layer (PDL) 180 may be disposed on the planarization layer 104 and may include an opening 182 through which the pixel electrode 172 is exposed. The pixel electrode 172 may be disposed in a location corresponding to the opening 182 of the PDL 180. The PDL 180 may include a polyacrylate resin or a polyimide resin.

An organic light emitting layer 174 may be disposed on the pixel electrode 172 in the opening 182 of the PDL 180. A common electrode 176 may be disposed on the PDL 180 and the organic light emitting layer 174.

The OLED 170 including the pixel electrode 172, the organic light emitting layer 174, and the common electrode 176 may be formed as described above.

The pixel electrode 172 or the common electrode 176 may include a transparent conductive material and the other of the pixel electrode 172 or the common electrode 176 not including the transparent conductive material may include a transflective or reflective conductive material. According to the types of materials included in the pixel electrode 172 and the common electrode 176, the OLED display may be classified into a top-emission, a bottom-emission, or a dual-emission display.

The transparent conductive material may include Indium Tin Oxide (ITO), Indium Zinc Oxide (IZO), zinc oxide (ZnO), or indium oxide ($In_2O_3$). The reflective material may include lithium (Li), calcium (Ca), lithium fluoride/calcium (LiF/Ca), lithium fluoride/aluminum (LiF/Al), aluminum (Al), silver (Ag), magnesium (Mg), or gold (Au).

The organic light emitting layer 174 may include a low molecular weight organic material or a high molecular weight organic material. The organic light emitting layer 174 may have a multilayer structure including at least one of a hole injection layer (HIL), a hole transport layer (HTL), a light emitting layer, an electron transport layer (ETL), and an electron injection layer (EIL). In an exemplary embodiment of the present invention the hole injection layer (HIL) may be disposed on the pixel electrode 172 serving as an anode, and the hole transport layer (HTL), the light emitting layer, the electron transport layer (ETL), and the electron injection layer (EIL) may be sequentially disposed on the hole injection layer (HIL).

The second substrate 200 may be disposed on the OLED 170. The second substrate 200 may be disposed opposite to (e.g., facing) the first substrate 100. The second substrate 200 may cover the TFT 140 and the OLED 170. The second substrate 200 may be a transparent insulating substrate including glass, quartz, or ceramic. The second substrate 200 may include a sealing member and may have a thin film structure in which an organic layer and an inorganic layer are alternately disposed.

In an exemplary embodiment of the present invention including a liquid crystal display (LCD), the pixel electrode may be physically and electrically coupled to the drain electrode through the contact opening and may receive data voltage from the drain electrode. The common electrode may be disposed on the substrate where the pixel electrode may be disposed or may be disposed on the opposite substrate. The common electrode may receive a common voltage.

The pixel electrode, which may receive the data voltage, may generate an electric field together with the common electrode. The common electrode may receive the common voltage, thereby determining an orientation of liquid crystal molecules of a liquid crystal layer between the first and second substrates. The pixel electrode and the common electrode may form a capacitor which may maintain an applied voltage after the TFT is turned off.

While the present invention has been shown and described with reference to the exemplary embodiments thereof, it will be apparent to those of ordinary skill in the art that various changes in form and detail may be made thereto without departing from the spirit and scope of the present invention.

What is claimed is:

1. A display device comprising:
    a first substrate;
    a second substrate disposed above the first substrate;
    a touch unit disposed on the second substrate;
    a window disposed on the touch unit, wherein the window covers the first and second substrates;
    a touch printed circuit board disposed on the second substrate, wherein the touch printed circuit board is coupled to the touch unit;
    an adhesive layer disposed between the first substrate and the window; and
    a plurality of spacers disposed between the touch printed circuit board and the window and arranged along a first side of the window opposite a second side of the window, wherein each of the plurality of spacers is spaced apart from each of the other spacers with spaces between adjacent spacers of the plurality of spacers, and wherein each of the spacers arranged along the first side of the window are aligned with each other along the first side of the window and are surrounded by and in direct contact with the adhesive layer.

2. The display device of claim 1, wherein the touch unit comprises a touch panel, a touch pad part, and a touch driver, and
    wherein the touch printed circuit board is connected to the touch pad part.

3. The display device of claim 1, wherein the touch printed circuit board is a flexible printed circuit board.

4. The display device of claim 1, further comprising:
    a driver disposed on the first substrate; and
    a driver printed circuit board disposed on the first substrate, wherein the driver printed circuit board is coupled to the driver.

5. The display device of claim 4, wherein the driver printed circuit board is a flexible printed circuit board.

6. The display device of claim 1, further comprising a polarizer disposed between the touch unit and the window.

7. The display device of claim 1, wherein a width of each of the spaces between the adjacent spacers of the plurality of spacers along the first side of the window is substantially the same as a thickness of each of the spacers of the plurality of spacers between the window and the touch printed circuit board.

8. The display device of claim 1, wherein a width of each of the spaces between the adjacent spacers of the plurality of spacers along the first side of the window is substantially the same as a width of each of the spacers.

9. A display device comprising:
    a first substrate;
    a second substrate disposed above the first substrate;
    a touch unit disposed on the second substrate;
    a window disposed on the touch unit, wherein the window covers the first and second substrates;
    a touch printed circuit board disposed on the second substrate, wherein the touch printed circuit board is coupled to the touch unit;
    an adhesive layer disposed between the first substrate and the window; and
    a spacer disposed between the touch printed circuit board and the window, wherein the spacer comprises a protruding pattern comprising a plurality of protruding portions, wherein the spacer is surrounded by and in direct contact with the adhesive layer, wherein the protruding pattern is arranged along a first side of the window opposite a second side of the window, wherein each of the protruding portions of the plurality of protruding portions is spaced apart from each of the other protruding portions of the plurality of protruding portions with spaces between adjacent protruding portions of the plurality of protruding portions, and wherein the plurality of protruding portions are aligned with each other along the first side of the window.

10. The display device of claim 9, wherein the touch unit comprises a touch panel, a touch pad part, and a touch driver, and wherein the touch printed circuit board is connected to the touch pad part.

11. The display device of claim 9, wherein the touch printed circuit board is a flexible printed circuit board.

12. The display device of claim 9, wherein the spacer is disposed on the touch printed circuit board, and wherein the protruding pattern has a polygon shape.

13. The display device of claim 9, further comprising:

a driver disposed on the first substrate; and a driver printed circuit board disposed on the first substrate, wherein the driver printed circuit board is coupled to the driver.

14. The display device of claim 13, wherein the driver printed circuit board is a flexible printed circuit board.

15. The display device of claim 9, further comprising a polarizer disposed between the touch unit and the window.

16. The display device of claim 9, wherein a width of each of the spaces between the adjacent protruding portions of the plurality of protruding portions along the first side of the window is substantially the same as a width of each of the protruding portions.

* * * * *